US005229203A

United States Patent [19]

Sato

[11] Patent Number: 5,229,203

[45] Date of Patent: Jul. 20, 1993

[54] RECORDING SHEET FOR OHP

[75] Inventor: Kazuo Sato, Tokyo, Japan

[73] Assignee: Nisshinbo Industries, Inc., Tokyo, Japan

[21] Appl. No.: 802,745

[22] Filed: Dec. 5, 1991

[30] Foreign Application Priority Data

| | | | |
|---|---|---|---|
| Dec. 10, 1990 | [JP] | Japan | 2-407160 |
| Dec. 27, 1990 | [JP] | Japan | 2-414970 |
| Jan. 31, 1991 | [JP] | Japan | 3-32037 |
| May 14, 1991 | [JP] | Japan | 3-137058 |
| Jun. 5, 1991 | [JP] | Japan | 3-159865 |

[51] Int. Cl.$^5$ .................................... B32B 9/00

[52] U.S. Cl. .................................... 428/327; 428/195; 428/206; 428/446; 428/454; 428/913

[58] Field of Search ............... 428/480, 409, 447, 195, 428/914, 206, 327, 411.1, 913; 430/281, 106.6, 126, 110

[56] References Cited

U.S. PATENT DOCUMENTS

| | | | |
|---|---|---|---|
| 4,599,293 | 7/1986 | Eckell et al. | 430/126 |
| 4,956,225 | 9/1990 | Malhotra | 428/216 |

*Primary Examiner*—Patrick J. Ryan
*Assistant Examiner*—W. Krynski
*Attorney, Agent, or Firm*—Rogers & Killeen

[57] ABSTRACT

A recording sheet for an OHP for use in a wet-type copying machine, the recording sheet for an OHP having: a base made of a transparent plastic film; and a toner fixing layer formed on the base, wherein the toner fixing layer is transparent and is composed mainly of a resin which can be dissolved or bloated in the solvent contained in a liquid developer. A recording sheet for an OHP for use in an electrostatic dry-type copying machine, the recording sheet for an OHP having: a base made of a transparent plastic film; and a toner fixing layer formed on the base, wherein the toner fixing layer is transparent and is composed mainly of a rubber type resin.

4 Claims, No Drawings

RECORDING SHEET FOR OHP

BACKGROUND OF THE INVENTION

1. Field of the Invention

The present invention relates to a recording sheet for use in an OHP in such a manner that a toner image is transferred/fixed to the surface of a film.

2. Related Art Statement

A conventional wet-type copying machine employs a copying method arranged in such a manner that a liquid developer is used to perform developing, a toner image is transferred to the surface of a film and a heat source is brought into direct contact with the surface of the film to which the toner image has been transferred so that the above-described toner image is fixed. Therefore, there arises a problem of an abnormal phenomenon such as undesirable run of the image or the like because the ordinary OHP sheet for use in a conventional dry-type copying machine cannot satisfactorily absorb the solvent contained in the liquid developer.

In order to overcome a problem of the type described above, there have been made a variety of disclosures.

That is, a technology has been disclosed in Japanese Patent Laid-Open No. 1-302266 which is arranged in such a manner that the surface of the sheet is subjected to a roughening treatment by using a hydrophobic resin and thereby the above-described solvent can be absorbed by the roughened surface layer of the sheet so that the image can be fixed satisfactorily. According to this method, no problem arises in a case where the quantity of the toner to be transferred is a small quantity. However, if a large quantity of the toner must be transferred, the above-described problem of the run of the image cannot be overcome because the roughened surface layer cannot satisfactorily absorb the above-described solvent. Another technology has been disclosed in Japanese Patent Laid-Open No. 2-47667 which is arranged in such a manner that a porous surface layer made of a devitrified resin is formed on the surface of the sheet to cause the toner to be perfectly absorbed by the porous surface layer regardless of the quantity of the toner. Furthermore, the sheet is passed through heating rollers so that the porous surface layer is melted and the devitrified porous surface layer is returned to the transparent state. As a result, the image is fixed as desired. Although the generation of the run of the image can be prevented according to the above-described method, excessively large thermal energy is required to melt the resin such that the temperature of the heating rollers must be raised to a level which is, by 20° C. to 30° C., higher than the temperature which is required to fix an image to an ordinary sheet.

On the other hand, the copying method employed in a conventional electrostatic dry-type copying machine is a method in which a toner image is formed by simply copying and printing an image to the surface of a recording sheet. The conventional recording sheets are exemplified by a recording sheet made of a non-porous type transparent plastic film subjected to a surface treatment such as a charge prevention process and a recording sheet made of a plastic film having the surface subjected to a roughening treatment in order to improve the toner fixing facility.

However, in a case where an image is copied and printed to the above-described recording sheet by the electrostatic dry-type copying machine, there arises a problem in that the toner can easily be separated from the sheet if the formed toner image is scrubbed by the claw or the like or the sheet is bent or crumpled because the formed toner image is baked and fixed to the surface of the sheet by only the binder contained in the toner ink.

SUMMARY OF THE INVENTION

An object of the present invention is to provide a recording sheet for an OHP for a conventional wet-type copying machine capable of preventing generation of image run on the sheet regardless of the quantity of a solvent to be transferred even if direct heat fixing is performed by using heating rollers and as well as capable of eliminating a necessity of providing considerably high temperature heating rollers. Another object of the present invention is to provide a recording sheet for an OHP for a dry-type copying machine having abrasion resistance of an extent with which toners cannot easily be separated even if the toner is scraped or the sheet itself is bent or crumpled.

According to one aspect of the present invention, there is provided a recording sheet for an OHP for use in a wet-type copying machine, the recording sheet for an OHP comprising: a base made of a transparent plastic film; and a toner fixing layer formed on the base, wherein the toner fixing layer is transparent and is composed mainly of a resin which can be dissolved or bloated in the solvent contained in a liquid developer and a recording sheet for an OHP for use in an electrostatic dry-type copying machine wherein its toner fixing layer is transparent and is composed mainly rubber type resin.

That is, inventors of the present invention have studied hard in order to overcome the above-described problems. As a result, a knowledge, from which the present invention could be established, was acquainted that it is effective for a toner layer on a transparent plastic film for use in a wet-type copying machine to be transparent and be composed mainly of a resin which can be dissolved or bloated in the solvent contained in a liquid developer. In this case, the above-described solvent can be absorbed into the toner fixing layer after the toner image has been transferred from the photosensitive member to the fixing layer. Therefore, the image run can be prevented even if the above-described surface of the toner image is brought into direct contact with a heating source, causing a clear image to be fixed and formed. Furthermore, it is effective for the toner fixing layer to be transparent and be composed mainly of a rubber type resin having large binding force and excellent elasticity in a case of an electrostatic drytype copying machine. In this case, the toner fixing layer exhibiting satisfactory abrasion resistance can be obtained so that it cannot be broken or deformed even if the sheet is bent or crumpled. As a result, a strong toner image can be formed.

Other and further objects, features and advantages of the invention will be appear more fully from the following description.

DETAILED DESCRIPTION OF THE PREFERRED EMBODIMENTS

A recording sheet for an OHP according to the present invention can be manufactured as follows:

A transparent plastic film for use as the base of the recording sheet for an OHP is exemplified by a transparent thermal plastic resin film, a polyvinyl alcohol film, a film made of a cellulose derivative and a film formed by orienting any of the above-described materials.

The transparent thermal plastic resin film is exemplified by a film made of polyethylene terephthalate, polypropylene, polystyrene, polyvinyl chloride, polymethyl methacrylate, polyethylene or polycarbonate or a film having an undercoat layer for the purpose of improving the adhesive facility between the surface made of any of the above-described materials and the toner fixing layer, and a film subjected to the corona discharge process. Usually, the polyethylene terephthalate film or a polyester film is employed because of its excellent heat resistance.

As a resin for constituting a transparent toner fixing layer of the recording sheet for an OHP for use in the wettype copying machine, a resin which is dissolved or bloated out in a solvent for use in the liquid developer and which becomes transparent after it has been dried in the form of film is employed. As the above-described solvent, a petroleum solvent having a high boiling point is employed to serve as the main component, and specifically ISOPER (manufactured by Exxon) is preferably employed.

As the resin which is dissolved or bloated out in the above-described solvent, a styrene type resin or a rubber type resin can be employed. Specifically, the styrene type resin is exemplified by a styrenated alkyd, a styrene-acrylic acid copolymer resin, or their substitution derivatives. As the substitution derivative, a calboxylated material or a material obtained by making it to be an alkaline reactive type may be employed in such a manner that a sole material or a mixture of them is used. The rubber type resin is exemplified by a styrene-butadiene copolymer resin, an acrylonitrile-butadiene copolymer resin, a methacrylate ester-butadiene copolymer resin, an acrylonitrile-styrene-butadiene copolymer resin, a methacrylate ester-styrene-butadiene copolymer resin, urethane acrylate rubber, a polynorbornane resin or their substitution derivatives. As the above-described substitution derivatives, a calboxylated material or a material obtained by making it to be an alkaline reactive type may be employed in such a manner that a sole material or a mixture of them is used.

The polynorbornane resin exhibits an excellent solubility and bloating tendency among the above-described rubber type resins. Therefore, the above-described solvent can significantly be absorbed when the same is used to form the surface layer of the OHP sheet.

The polynorbornane can be obtained by a method comprising the steps of synthesizing norbornane from ethylene and cyclopentadiene by the Diels-Alder reaction and ring-opening-polymerizing the norbornane monomer.

Furthermore, also an excellent solvent absorptivity is realized by a resin composed of 97 to 30 wt % of a block copolymer having a structure containing, in its polymer chain, one or more 1,4-trans conjugated diene polymer block having crystallizability at 25° C. interposed between two or more vinyl aromatic hydrocarbon polymer blocks the glass-transition temperature of which is 50° C. or higher and 3 to 70 wt % of a crystalline polymer having a low melting point such that it can be melted in a temperature range from 25° C. to 150° C.

The monomer constituting the block copolymer may comprise a vinyl aromatic hydrocarbon exemplified by styrene, α-methylstyrene, p-methylstyrene, m-methylstyrene, o-methylstyrene, p-tert-butylstyrene, dimethylstyrene and vinylnaphthalene for the vinylaromatic hydrocarbon polymer blocks and butadiene, isoprene and piperylene for the 1,4-trans conjugated diene block. It is preferable that the monomer be styrene and butadiene. A preferred example of the crystalline polymer is a transbutadiene polymer. transpolyisoprene, transpolyoctenylene, poly-ε-caprolactone or the like. The above-described resin is specifically exemplified by "Asmer" (trade name) manufactured by Asahi Kasei.

Also a styrene-butadiene thermal plastic elastomer composed of polystyrene blocks and polybutadiene blocks is significantly effective to absorb the above-described solvent and therefore it can be effectively employed in the present invention. It can be considered that the reason for this lies in that the total contents of its butadiene blocks contributing to the solvent absorption is very high, that is, 50 to 80% having a large molecular weight of 50,000 to 500,000 and the styrene blocks and the butadiene blocks are oriented extremely regularly in comparison to that in the latex type elastomer.

The above-described elastomer can be available from the market as "Taffprene Series", "Solprene Series" and "Asaprene Series", respectively.

It is preferable that the thickness of the above-described toner layer be 5 μm to 50 μm, preferably 10 μm to 45 μm. In general, the above-described image run at the time of the image fixing process can be substantially prevented and thereby an image exhibiting excellent quality can be formed when 40% or more, preferably 45% or more of the solvent in the liquid developer is absorbed into the toner fixing layer. Therefore, it is preferable that the thickness of the toner layer be made as described above. In a case where the polynorbornane resin is used, it is sufficient for the thickness of the toner layer to be 0.1 μm or more.

In order to prevent undesirable blocking which can be taken place at the time of stacking the sheets, it is preferable that an inorganic or organic filler be mixed in the above-described toner fixing layer by a quantity with which the transparency can be maintained. The inorganic filler is exemplified by calcium carbonate, magnesium carbonate, zinc oxide, titanium oxide, mica, clay, silica powder, colloidal silica and diatomaceous. The organic filler is exemplified by polyethylene and an acrylic resin. Small uneven portions can be formed on the surface layer of the toner fixing layer depending upon the particle size of the filler.

Furthermore, ethylene bisamide and stearic acid amide are respectively effective to prevent blocking.

Then, a method of forming the toner fixing layer on a substrate will now be described. A transparent plastic film serving as the base is coated with any one of the above-described resins of an emulsion, latex, water solution or solvent dissoluble type by any one of a known wire bar method, a doctor blade method or an air knife method to form a layer having a predetermined thickness. Then, the coated resin is dried so that the desired recording sheet for an OHP for the wet-type copying machine is obtained.

During the above-described process, a charge prevention treatment may, of course, be performed in order to prevent the undesirable charge.

It is preferable that the resin for forming the above-described toner fixing layer for the OHP sheet for use in the electrostatic dry-type copying machine be the rubber type resin since it exhibits excellent wear resistance, large binding force and elasticity, the rubber type resin being exemplified by a styrene-butadiene copolymer resin, an acrylonitrile-butadiene copolymer resin, a methacrylate ester-butadiene copolymer resin, an acrylonitrile-styrene-butadiene copolymer resin, a methacrylate ester-styrene-butadiene copolymer resin, urethane acrylate rubber, a polynorbornane resin and their substitution derivatives. As the above-described substitution derivatives, a calboxylated material or a material obtained by making it to be an alkaline reactive type may be employed in such a manner that a sole material or a mixture of them is used.

Since the polynorbornane resin has a large molecular weight of millions, exhibits excellent elasticity, wear resistance and satisfactory affinity with the toner for the dry-type copying machine among the above-described rubber type resins, it is significantly effective when it is used to form the surface layer of the sheet according to the present invention.

The thickness of the above-described toner fixing layer must be 1 μm or more, preferably 2 μm or more. If the thickness is thinner than the above-described value, the resin cannot sufficiently surround the toner particles of the toner image formed and fixed onto the surface of sheet. Therefore, a desired sheet cannot be obtained.

However, in a case where the polynorbornane resin is used, it is sufficient for the thickness of the toner fixing layer to be 0.1 μm or more because of the above-described large molecular weight and satisfactory affinity.

In order to prevent undesirable blocking which can be taken place at the time of stacking the sheets, it is, similarly to the arrangement for the recording sheet for an OHP for the wet-type copying machine, preferable that an inorganic or organic filler be mixed in the above-described toner fixing layer by a quantity with which the transparency can be maintained. The inorganic filler is exemplified by calcium carbonate, magnesium carbonate, zinc oxide, titanium oxide, mica, clay, silica powder, colloidal silica and diatomaceous. The organic filler is exemplified by polyethylene and an acrylic resin. Small uneven portions can be formed on the surface layer of the toner fixing layer depending upon the particle size of the filler.

Furthermore, ethylene bisamide and stearic acid amide are respectively effective to prevent blocking.

Then, a method of forming the toner fixing layer on a substrate will now be described. A transparent plastic film serving as the base is coated with any one of the above-described resins of an emulsion, latex, water solution or solvent dissoluble type by any one of a known wire bar method, a doctor blade method and an air knife method to form a layer having a predetermined thickness. Then, the coated resin is dried so that the desired recording sheet for an OHP is obtained.

During the above-described process, a charge prevention treatment may, of course, be performed in order to prevent the undesirable charge.

As described above, the recording sheet for an OHP according to the present invention for use in the wet-type copying machine is obtained in such a manner that the transparent plastic film serving as the base is coated with the resin for forming the toner fixing layer by the known means. The resin becomes transparent after it has been dried. Therefore, excellent transparency can be realized as the overall body of the sheet.

Furthermore, since the resin for forming the toner fixing layer is the resin which can be dissolved or bloated in the solvent of the liquid developer for use in the wettype copying machine, a solvent absorbing mechanism can be formed even if the toner fixing layer is a transparent and non-porous layer. Therefore, excellent solvent aborptivity can be realized. As a result, the undesired image run can be prevented even if the image surface is brought into direct contact with the surface of the heating source after the toner image has been transferred from the photosensitive member to the surface of the sheet fixing layer. Consequently, a very clear image can be fixed and formed.

On the other hand, the recording sheet for an OHP for use in the electrostatic copying machine exhibits a satisfactory printing performance such as the dot reproducibility of the toner particles and the fixing facility. Furthermore, the same has satisfactory abrasion resistance. In addition, since the overall sheet thus-formed exhibits satisfactory transparency, an electrostatic dry-type copying machine exhibiting excellent monochromatic characteristics and full color characteristics are enabled to exhibit its excellent characteristics when the OHP recording sheet according to the present invention is used.

EXAMPLES

Then, examples according to the present invention will now be described.

EXAMPLE 1

A styrene-acryl copolymer resin (emulsion type Movinyl 8000 manufactured by Hext having a solid portion of 40%) was, by using an applicator, applied to a transparent polyester film the thickness of which was 100 μm before it was dried for 3 minutes by a constant-temperature drier set to 100° C. so that a recording sheet for an OHP for use in the wet-type copying machine according to the present invention was manufactured. The surface layer of the recording sheet for an OHP thus-formed, that is, the toner fixing layer was completely transparent and the thickness of the layer was 30 μm.

The sheet thus-obtained was subjected to a continuous copying operation by using a wet-type copying machine CT-5085 manufactured by RICOH at a line speed of 266 mm/sec. As a result, the run of the image, the contamination of the surface of the roller and that of the image offset and the like were completely prevented and a clear image was obtained. In this state, the fixing temperature was set to 145° C.

EXAMPLE 2

A carboxy-denatured-styrene-butadiene copolymer latex (the solid portion was 25%) with which 0.5 wt % talc powder (the average particle size was 10 μm) was mixed was, by using an applicator, applied to a transparent plastic film the thickness of which was 100 μm before it was dried for 2 minutes by a constant-temperature drier set to 100° C. so that a recording sheet for an OHP was manufactured. The surface layer of the recording sheet for an OHP thus-formed, that is, the toner fixing layer was transparent and the thickness of the layer was 25 μm.

The sheet thus-obtained was subjected to a continuous copying operation by using the same copying machine under the same conditions as those according to Example 1. As a result, a clear image was obtained similarly to Example 1.

EXAMPLE 3

An electron radiation curable resin (the solid portion was 100% and Tg=0° C.) composed of urethane acrylate rubber was, by using an applicator, applied to a transparent plastic film the thickness of which was 100 μm before it was radiated with electron beams at an intensity of 5 megarad so that a recording sheet for an OHP was manufactured. The surface layer of the recording sheet for an OHP thus-formed, that is, the toner fixing layer was transparent.

The sheet thus-obtained was subjected to a continuous copying operation by using the same copying machine under the same conditions as those according to Example 1. As a result, a clear image was obtained similarly to Example 1.

EXAMPLE 4

Liquid to be applied was prepared by mixing 100 parts by weight of polynorbornane resin solution (Norsolex NSX-L manufactured by Zeon) with 400 parts by weight of toluene before they are stirred sufficiently. It was then, by using an applicator, applied to a transparent polyester film the thickness of which was 100 μm before it was dried for 3 minutes by a constant-temperature drier set to 100° C. so that a recording sheet for an OHP was manufactured. The surface layer of the recording sheet for an OHP thus-formed, that is, the toner fixing layer was completely transparent and the thickness of the layer was 0.3 μm.

The sheet thus-obtained was subjected to a continuous copying operation by using the same copying machine under the same conditions as those according to Example 1. As a result, an image which was clearer than that obtained according to Example 1 was formed.

EXAMPLE 5

A toluene solution (the solid portion was 15%) of ASMER manufactured by Asahi Kasei was, by using an applicator, applied to a transparent polyester film the thickness of which was 100 μm before it was dried for 3 minutes by a constant-temperature drier set to 100° C. so that a recording sheet for an OHP was manufactured. The surface layer of the recording sheet for an OHP thus-formed, that is, the toner fixing layer was transparent and the thickness of the layer was 0.5 μm.

The sheet thus-obtained was subjected to a continuous copying operation by using the same copying machine under the same conditions as those according to Example 1. As a result, an image which was clearer than that obtained according to Example 1 was formed.

EXAMPLE 6

A toluene solution (the solid portion was 20%) of a styrene-butadiene thermoplastic elastomer (SOLPRENE T-411 manufactured by Asahi Kasei) in which the weight ratio of styrene/butadiene was 30/70 and the molecular weight was 300,000) was, by using an applicator, applied to a polyester film the thickness of which was 100 μm before it was dried for 3 minutes by a constant-temperature drier set to 100° C. so that a recording sheet for an OHP was manufactured. The surface layer of the recording sheet for an OHP thus-formed, that is, the toner fixing layer was transparent and the thickness of the layer was 10 μm.

The sheet thus-obtained was subjected to a continuous copying operation by using the same copying machine under the same conditions as those according to Example 1. As a result, an image which was clearer than that obtained according to Example 1 was obtained.

EXAMPLE 7

A carboxy-denatured-styrene-butadiene copolymer latex (the solid portion was 25%) mixed with 0.5 wt % talc powder (the average particle size was 10 μm) was, by using an applicator, applied to a transparent polyester film the thickness of which was 100 μm before it was dried for 2 minutes by a constant-temperature drier set to 100° C. so that a recording sheet for an OHP according to the present invention for the electrostatic dry-type copying machine was manufactured.

The surface layer of the recording sheet for an OHP thus-formed, that is, the toner fixing layer was transparent and the thickness of the layer was 5 μm.

The OHP recording sheet thus-manufactured was used in a monochromatic copying operation by using an electrostatic dry-type copying machine (FUJIXEROX 5990 manufactured by Fuji Xerox). As a result, a clear image was formed while exhibiting excellent dot reproducibility in the fine portions of the toner image and satisfactory fixing characteristics.

Furthermore, satisfactory abrasion resistance was exhibited such that the toner could not be separated even if the toner image was scraped or the sheet itself was crumpled.

EXAMPLE 8

Liquid to be applied was prepared by mixing 100 parts by weight of polynorbornane resin (Norsolex NSX-L manufactured by Zeon) with 5 parts by weight of toluene before they are stirred sufficiently. It was then, by using an applicator, applied to a transparent polyester film the thickness of which was 100 μm before it was dried for 3 minutes by a constant-temperature drier set to 100° C. so that a recording sheet for an OHP was manufactured. The surface layer of the recording sheet for an OHP thus-formed, that is, the toner fixing layer was completely transparent and the thickness of the layer was 0.6 μm.

The sheet thus-obtained was subjected to a continuous copying operation by using the same copying machine under the same conditions as those according to Example 7. As a result, an image which was clearer than that obtained according to Example 7 and exhibiting satisfactory abrasion resistance was formed.

EXAMPLE 9

A toluene solution (the solid portion was 20%) of a styrene-butadiene thermoplastic elastomer (SOLPRENE T-411 manufactured by Asahi Kasei) in which the weight ratio of styrene/butadiene was 30/70 and the molecular weight was 300,000) was, by using an applicator, applied to a transparent polyester film the thickness of which was 100 μm before it was dried for 3 minutes by a constant-temperature drier set to 100° C. so that a recording sheet for an OHP according to another example of the present invention was manufactured. The surface layer of the recording sheet for an OHP thus-formed, that is, the toner fixing layer was transparent and the thickness of the layer was 10 μm.

The sheet thus-obtained was subjected to a continuous copying operation by using the same copying machine under the same conditions as those according to Example 7. As a result, an image which was similarly clear to that obtained according to Example 7 and exhibiting satisfactory abrasion resistance was formed.

Although the invention has been described in its preferred form, it is to be understood that the present disclosure of the preferred form can be changed in the details of construction and the combination and arrangement of parts without departing from the spirit and the scope of the invention as hereinafter claimed.

What is claimed is:

1. A recording sheet for an OHP for use in a wet-type copying machine comprising:

a base made of transparent plastic film; and a toner fixing layer formed on said base, wherein said toner fixing layer is transparent and comprises a polynorbornane resin which can be dissolved or bloated in the solvent contained in a liquid developer and has a thickness of at least 0.1 μm.

2. The recording sheet of claim 1 wherein said toner fixing layer further comprises an inorganic filler selected from the group comprising calcium carbonate, magnesium carbonate, zinc oxide, titanium oxide, mica, clay, silica powder, colloidal silica and diatomaceous.

3. The recording sheet of claim 1 wherein said toner fixing layer further comprises an organic filler selected from the group comprising polyethylene and an acrylic resin.

4. The recording sheet of claim 1 wherein said toner fixing layer further comprises ethylene bisamide or stearic acid.

* * * * *